United States Patent [19]

Voorhees, Jr.

[11] 4,214,723
[45] Jul. 29, 1980

[54] SUPPORT FOR TUBING OR CABLES IN BUILDINGS

[76] Inventor: James M. Voorhees, Jr., 3921 River Club Rd., Edgewater, Md. 21037

[21] Appl. No.: 911,301

[22] Filed: Jun. 1, 1978

[51] Int. Cl.² ............................................. F16L 3/22
[52] U.S. Cl. ................................. 248/68 R; 248/74 A
[58] Field of Search ................ 248/68 R, 74 R, 74 A, 248/71, 62, 68 CB; 174/159, 166 R, 166 S, 164, 165; 24/127

[56] References Cited

U.S. PATENT DOCUMENTS

| | | | |
|---|---|---|---|
| 324,692 | 8/1885 | Hill | 174/159 X |
| 619,555 | 2/1899 | Frantz | 174/165 X |
| 1,105,664 | 8/1914 | Jansson | 174/159 |
| 1,435,069 | 11/1922 | Jansson | 174/159 X |
| 1,888,342 | 11/1932 | Anderson | 248/68 R |
| 2,528,288 | 10/1950 | Rublee | 174/159 |
| 2,677,863 | 5/1954 | St. John | 24/127 |
| 2,948,937 | 8/1960 | Rapata | 248/74 R |
| 3,597,808 | 8/1971 | Johnson | 24/127 |
| 4,074,501 | 2/1978 | Sandquist | 85/28 X |

FOREIGN PATENT DOCUMENTS

| | | | |
|---|---|---|---|
| 2036455 | 1/1972 | Fed. Rep. of Germany | 174/164 |
| 1445725 | 12/1966 | France | 174/164 |
| 1077713 | 8/1967 | United Kingdom | 24/127 |

*Primary Examiner*—Rodney H. Bonck
*Attorney, Agent, or Firm*—B. P. Fishburne, Jr.

[57] ABSTRACT

A disc body formed of tough somewhat resilient plastics has a center cylindrical hub of lesser diameter than the disc body projecting axially beyond one side of the disc body and joined therewith by a smooth fillet. The flat end face of the hub engages a building ceiling or wall to create a stand-off space between the ceiling or wall and the marginal lip of the disc body whereby tubes or cables may be snapped into supported engagement with the disc body in any direction tangent to the cylindrical hub. The device has a central aperture for a supporting fastener, such as a nail, which may be power driven.

1 Claim, 4 Drawing Figures

SUPPORT FOR TUBING OR CABLES IN BUILDINGS

BACKGROUND OF THE INVENTION

In the construction of modern buildings, it has become customary practice to string tubing and/or electrical cables along the bottom faces of floor slabs prior to finishing operations on the building and to support such tubing or cables at regularly spaced intervals near the building walls. Recently, equipment has been devised to enable workers standing on the floor below to power nail suitable tubing or cable support clips or brackets to the bottom of the next uppermost floor slab in the desired spaced relationship, such as several feet apart. Such equipment involves a supporting pole for a power nailing gun and means to trigger the gun without climbing a ladder. The tubing or cable support elements may consist of simple L-brackets to which the tubes or cables may be tied, or various types of spring metal clips to which tubes or cables can be supportingly engaged after installation of the clips.

In addition to lack of standardization and excessive cost, the prior art supporting elements have had the common failing of being unidirectional with respect to the direction or axes of tubes or cables being supported thereby, and the support elements in the prior art are not well adapted to support plastic tubing around relatively sharp corners without cutting or cracking it.

The objective of the present invention is to completely overcome the above and other deficiencies of the prior art by providing a more simplified, economical, safer and much more efficient and convenient support for tubing or electrical cables in buildings. More specifically, the invention provides a support element which is omnidirectional and well adapted to guide and support tubing or cables around corners without cracking or cutting it. The support element forming the main subject matter of the invention is unitary in construction and molded from an inexpensive tough and durable plastics material having a sufficient degree of resiliency to yield and produce the required snap action when tubing or cables are engaged between it and an adjacent ceiling or wall surface, as the case may be. Preferably, the support element is formed of a polycarbonate.

A further advantage of the unitary molded plastics device is the inability of the device to cut or damage the tubing or cables or the hands of workers installing the latter, and this is in contrast to the prior art metallic spring clips and brackets.

Other features and advantages of the invention will become apparent to those skilled in the art during the course of the following detailed description.

SUMMARY OF THE INVENTION

A unitary disc body formed of tough somewhat resilient material is tapered toward its peripheral edge and somewhat concave on its face which opposes a flat supporting surface during use. A center cylindrical hub extends axially from the concave side of the disc body and has a flat end face spaced therefrom for abutment with the flat supporting surface to which the device is anchored by a nail or the like engaging through a provided center aperture therein. A generous fillet joins the hub with the tapered disc body and a restricted passage is formed between the peripheral edge of the disc body and said flat supporting surface through which tubing or cables may be passed with a snapping action into tangential contact with the cylindrical hub while extending in any direction tangent to the hub. A gripping action is exerted by the device on supported tubing or cables.

DETAILED DESCRIPTION

Figure 1:
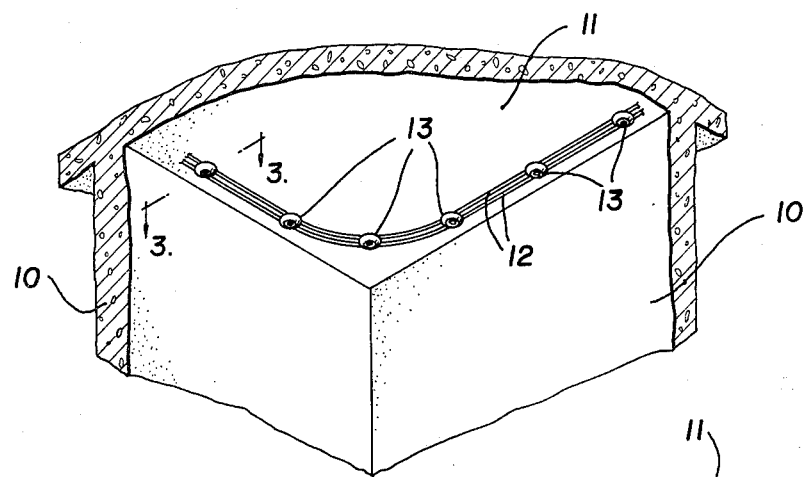
FIG. 1 is a fragmentary perspective view of the invention installed in a building to support tubing or cables.

Referring to the drawings in detail, wherein like numerals designate like parts, a concrete building depicted in fragment in FIG. 1 includes walls 10 and a floor slab 11 which may be formed of concrete. Before the building is finished in its interior, tubing and/or electrical cables are customarily installed on the bottoms of the floor slabs 11 near the building walls 10, as schematically illustrated in FIG. 1. In the drawing illustration, a pair of parallel plastic tubes 12 are shown supported by the invention, it being understood that copper tubes, rubber hoses, or electrical cables can also be supported by the invention in the same manner. As shown in FIG. 1, the tubes 12 are supported at regular spaced intervals along their lengths by units of the invention designated generally at 13. The units 13 in practice are spaced apart several feet at least and the showing in FIG. 1 is exaggerated as to the closeness of the units 13 so that several may be illustrated at a corner defined by the walls 10.

Figure 4:
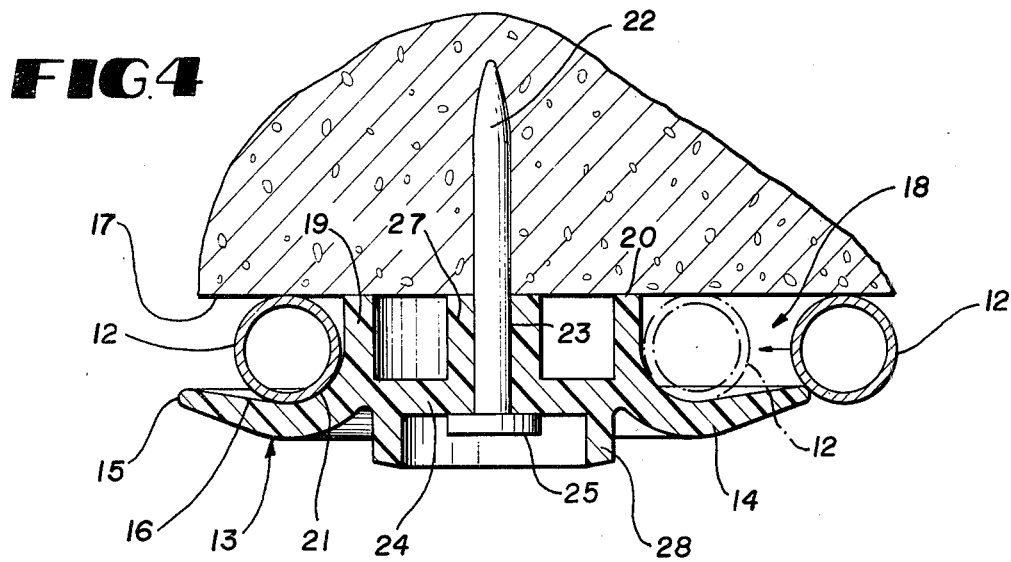
FIG. 4 is a further enlarged central vertical section through the device and tubing being supported thereby.

Each invention unit or support 13 comprises a disc body 14 formed of a tough durable and slightly resilient plastics material such as a polycarbonate. The disc body 14 is uniformly tapered radially to a quite narrow rounded peripheral edge 15 which is incapable of cutting the hands of workers or the tubing or cable being supported. The disc body 14 is dished or concave on its side 16 which opposes a fixed flat support surface 17, such as the bottom of the floor slab 11 in FIG. 1, or a vertical wall surface in some cases. The tapered dished disc body 14 is of uniform cross section around its circumference. Due to its comparatively thin tapered formation, the disc body 14 is somewhat yielding particularly near its peripheral edge 15 so that plastic tubing 12 or the like may be snapped through the restricted annular passage 18 formed between the support surface 17 and the disc body 14, as indicated by the arrow in FIG. 4.

Figure 3:
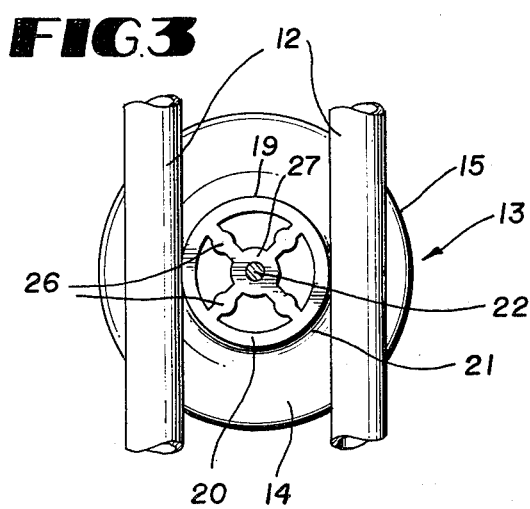
FIG. 3 is an enlarged horizontal section taken on line 3—3 of FIG. 1.
Figure 2:
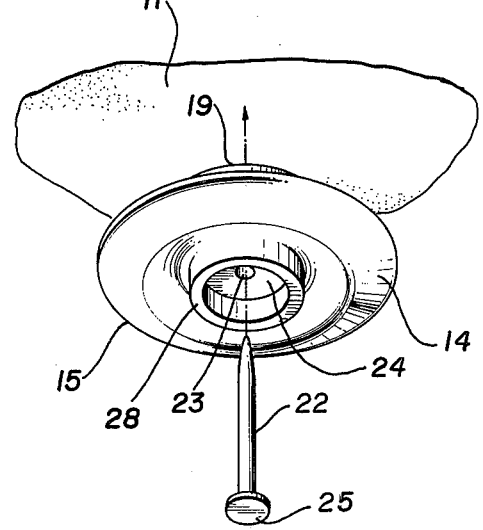
FIG. 2 is an enlarged exploded perspective view of the support device embodied in the invention.

Formed centrally and integrally on the disc body 14 is an axial cylindrical hub 19 having a flat end face 20 at right angles to the axis of the disc body and hub. The outer surface of the cylindrical hub 19 is joined with the dished surface 16 of disc body 14 by a uniform comparatively large smooth radius ported or fillet 21 extending entirely around the device circumferentially. The fillet 21 forms with the exterior of the hub 19 and the dished surface 16 a stable seat for a tube or pair of tubes 12 or electrical cables. After passing through the restricted passage or mouth 18 with a snapping action, the tubes 12 lie in the fillet 21 and are tangent to the hub 19 as best shown in FIG. 3. Due to the resiliency of the disc body 14, its peripheral edge or lip 15 exerts a clamping and holding force on the tube or cable securing it firmly against the surface 17. As clearly shown in FIG. 4, the radius of the fillet 21 is approximately equal to one-half the distance between the surface 17 and the low point of the upper dished or concave face of the disc body 14.

Each supporting unit 13 is anchored against the surface 17 by a driven fastener 22 which is received through a center preformed aperture 23 in the device. A flat wall 24 of the support device approximately in the plane of the disc body 14 forms a seat for the fastener head 25 which may be power driven by means of conventional power nailing gun equipment discussed in the introduction to the application. To decrease material without loss of strength, the hub 19 is made hollow and its inner and outer walls are joined by circumferentially spaced radial webs 26, as best shown in FIG. 3. The nail aperture 23 is formed through the inner wall 27 of the hub 19, as illustrated. On its side away from the axial hub 19, the device 13 may have a short integral ring 28 surrounding the nail head 25. In some cases, this ring or extension of the device can be omitted.

It may be seen that, when a plurality of the support units 13 are secured in the described manner to the slab 11 in properly spaced relationship, they collectively form a support for tubing 12 or electrical cables enabling the latter to be installed and supported conveniently and expeditiously and securely throughout an entire building with minimum expense. A particular feature of the invention is its universality of direction in relation to the supported tubes 12 or cables. That is to say, tubes or cables held by the device may be extended therefrom in any direction around the axis of the device tangent to its hub 19. In all directions, the supported tubes or cables are gripped and held firmly against the surface 17. The cylindrical formation of the hub 19 and the circular configuration of the entire device is most advantageous in supporting tubes and cables around abrupt corners without excessively bending or cracking the same, as sometimes occurs in the prior art. The described features of the invention collectively make it a most ideal supporting means for plastic tubing and/or cables in newly constructed concrete buildings, and the device may be utilized in other types of buildings as well. It is thought that the utility and advantages of the invention have now been adequately described and will be readily understood by those skilled in the art.

It is to be understood that the form of the invention herewith shown and described is to be taken as a preferred example of the same, and that various changes in the shape, size and arrangement of parts may be resorted to without departing from the spirit of the invention or scope of the subjoined claims.

I claim:

1. A support element for bendable tubing or electrical cables in building construction comprising a unitary support element formed of a tough resilient material having a central hub defining a wide flat end face adapted for abutment with a ceiling surface against which tubing or electrical cables are to be held, a disc-like portion joined integrally with the central hub at the end of the hub away from said flat end face and being joined to the hub by a smooth arcuate wall portion whose radius is approximately one-half the distance between a plane defined by said flat end face and the low point on the upper side of said disc-like portion during the use of the support element, the disc-like portion tapering radially outwardly from said arcuate wall portion and terminating in a comparatively thin marginal circular edge which is spaced from the plane of the flat end face a distance substantially less than the distance between the plane of the end face and said low point, whereby tubing or electrical cables to be supported can be forced laterally through a constricted space between said thin marginal circular edge and an opposing ceiling surface against which the flat end face is abutted during use of the support element, the inserted tubing or cables then engaging snugly between said ceiling surface and said arcuate wall portion and lying substantially tangent to the periphery of the central hub, said hub being cylindrically formed, said thin marginal circular edge being disposed radially beyond the periphery of the central hub a substantially greater distance than the spacing of said edge from said plane of said flat end face of the hub and said distance also being substantially greater than said radius of the arcuate wall portion to thereby define on the upper face of the tapering disc-like portion outwardly of the arcuate wall portion an annular radially wide inclined surface portion immediately inwardly of said circular edge, and said central hub having an axial central through opening adapted to receive a driven fastener used to anchor the support element firmly against a ceiling surface in a building.

* * * * *